Apr. 3, 1923.

R. M. LOVEJOY

SHOCK ABSORBER

Filed Dec. 15, 1919

1,450,601

Inventor.
Ralph M. Lovejoy
by Heard Smith & Tennant.
Attys

Patented Apr. 3, 1923.

1,450,601

UNITED STATES PATENT OFFICE.

RALPH M. LOVEJOY, OF MEREDITH, NEW HAMPSHIRE.

SHOCK ABSORBER.

Application filed December 15, 1919. Serial No. 344,969.

*To all whom it may concern:*

Be it known that I, RALPH M. LOVEJOY, a citizen of the United States, and resident of Meredith, county of Belknap, State of New Hampshire, have invented an Improvement in Shock Absorbers, of which the following description, in connection with the accompanying drawing, is a specification, like characters on the drawing representing like parts.

This invention relates to improvements in shock absorbers adapted to cushion the movement of two relatively movable members and the object thereof is to provide a shock absorber which will be adapted more effectively to dissipate the shock of relatively slight movements between said movable members.

The invention comprises certain improvements upon the shock absorber disclosed in my prior application, Serial No. 145,126, filed January 29, 1917, Patent Number 1,324,913 granted December 16, 1919, and which comprises a cashing adapted to be secured to one of the relatively movable members, having a fluid chamber and a cylinder therein, a piston reciprocably mounted in said cylinder and having means adapted to be connected to the other relatively movable member, means being provided for permitting the free flow of fluid from the fluid chamber to the cylinder when the piston moves in one direction and for impeding the flow of fluid from the cylinder to the fluid chamber when the piston moves in the opposite direction.

The object of the present invention more specifically stated, is to provide an improved means for restricting the flow of fluid from the cylinder to the fluid chamber.

A further object of the invention is to provide an improved form of valve mechanism for permitting a flow of fluid from the fluid chamber to the cylinder.

A further object of the invention is to provide an improved form of unbalanced valve for delivering fluid from the cylinder to the fluid chamber when the piston is subjected to heavy shocks.

A further object of the invention is to provide an improved form of casing which can be more readily machined and in which the parts of the shock absorber may be more conveniently assembled.

Other objects and features of the invention will more fully appear from the following description and the accompanying drawings and will be pointed out in the annexed claims.

The drawings show a preferred embodiment of my invention adapted to be used to cushion the relative movement between the body and axle of a vehicle, such as an automobile.

Figure 1:
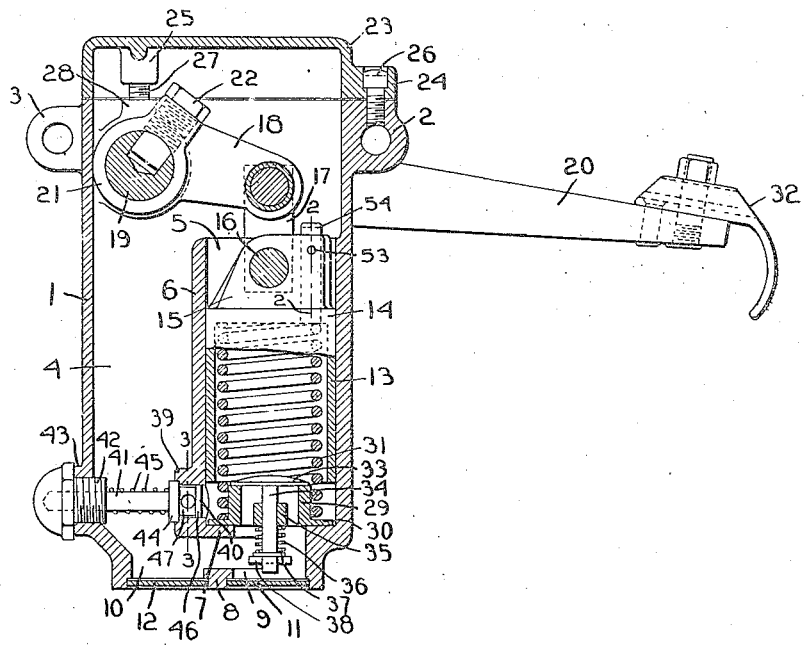
Fig. 1 is a vertical longitudinal sectional central view of a shock absorber embodying my invention.
Figure 2:
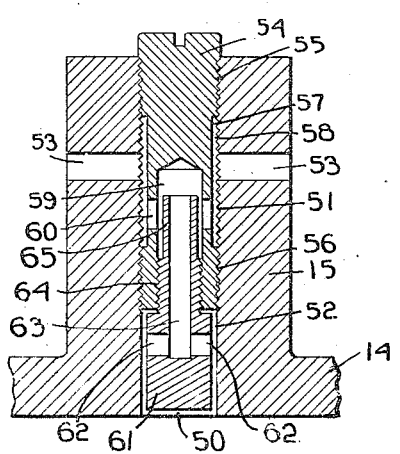
Fig. 2 is an enlarged vertical section detail view on lines 2—2 Fig. 1 of the mechanism for restricting the delivery of fluid from the cylinder to the fluid chamber, said mechanism being illustrated as embodied in the piston head.

While the mechanism is disclosed herein as applied to a shock absorber comprising a fluid chamber and a cylinder having a piston reciprocable therein, it will be understood that the mechanism for restricting the flow of fluid from the piston containing chamber may be applied to any form of device comprising two fluid containing compartments, one of which is provided with a piston and having means for permitting the free flow of fluid into the piston containing compartment. It will also be understood that while the mechanism for restricting the flow of fluid from the piston containing chamber as illustrated herein is located in the piston head, my invention contemplates the location of such a fluid restricting mechanism at any convenient point, either in the piston head or in the wall of the piston containing compartment.

In the illustrative embodiment of the invention disclosed herein the shock absorber comprises a casing 1, preferably substantially rectangular in cross section, having suitable means, such as bosses 2, 3 to receive bolts by means of which it may be secured to one of the relatively movable members, said casing presenting a fluid chamber 4 and a cylinder 5, the wall 6 of which desirably is cast integral with the walls of the casing and extends only a portion of the distance therethrough. The cylinder 5 is also provided with a head 7 which likewise is formed integral with the casing and is located at a distance from the lower end wall 8 of the casing. A port in the cylinder head 7 of large area provides means through which fluid from the fluid chamber 4 may be admitted into the cylinder.

For convenience in construction the lower end 8 of the casing desirably is provided with two large, preferably circular, apertures 9 and 10, through which the cores used in casting the casing may be removed and which also provides ready means of access to the interior of the casing. Suitable closures 11 and 12, preferably resilient metallic disks forced into counter-sinks in the walls of the openings 9 and 10, serve to close said openings when the shock absorber has been otherwise assembled. The piston, which is reciprocably mounted in the cylinder 5, preferably is of hollow construction comprising a cylindrical portion 13 which fits within the cylinder 5, and a head 14 having an upwardly extending integral boss 15. The boss 15 is provided with a transverse aperture to receive a stud 16 by means of which it is connected to a link 17 which in turn is connected to the arm 18 of a rock shaft 19; the other arm 20 of which is adapted to be secured to the other relatively movable member. The arm 20 desirably is symmetrical in form in respect to its longitudinal axis and is, therefore, reversible. By reason of this construction the same arm may be used either upon right or left hand shock absorbers.

The arm 18 of the rock shaft desirably is provided with a boss 21 having an aperture to receive the rock shaft 19 and is secured to it by a screw threaded plug 22, the screw threads of which engage complementary screw threads in the arm 18 and the end of which enters a suitable socket in the rock shaft 19. The casing is provided with a cover 23 having suitable bosses 24 and 25 through which set screws 26 and 27 extend respectively into bosses 2 and 28 in the casing, thus providing means for securing the cap firmly upon the casing.

In order to permit the fluid to flow freely from the fluid chamber 4 into the cylinder 5 a valve opening upwardly from the inlet port is provided. A preferred form of valve mechanism which is illustrated herein comprises a valve cage 29 having an annular flange 30 seated upon the upper wall of the cylinder head 7. A helical spring 31 within the cylindrical portion 13 of the piston rests at its lower end upon the annular flange 30 and at its upper end engages the under-face of the piston head 14; the spring 31 thereby acts to hold the valve cage 29 firmly upon its seat and also tends to force the piston upwardly thereby raising the arm 20 of the rock shaft and maintaining a suitable tension upon the mechanism which connects the end of the rock shaft to the other rotatable member, such as the axle of the automobile.

In the present construction a flexible rope or strap is provided which is secured to a suitable clamp 32 carried at the end of the arm 20.

A suitable valve is provided for permitting the fluid to flow freely from the lower portion of the fluid chamber into the cylinder. The preferred form of valve illustrated herein comprises a flat or disk valve 33 which seats upon the upper end of the valve cage 29 and is provided with a central stem 34 which passes through a web 35 extending transversely of said valve cage 29. A helical spring 36 engaging at its upper end the web 35 and at its lower end resting upon a washer 37 secured upon the stem 34 by a pin 38 tends normally to maintain the valve in closed position. The spring 36 preferably is very light so that fluid may flow freely from the fluid chamber into the cylinder when the piston is raised, but said spring is of such sufficient strength to seat the valve quickly when the upward movement of the piston has ceased. By reason of this construction the fluid from the fluid chamber will readily be drawn into the cylinder by the upward movement of the piston and prevented from flowing backwardly into the fluid chamber through this port.

In the present construction, as in that disclosed in my prior patent, a yieldable unbalanced valve is provided for permitting the fluid in the cylinder to be forced into the fluid chamber when the piston is subjected to a severe shock. The present form, however, of unbalanced valve differs from that disclosed in my prior application. As illustrated herein the lower end of the cylinder is provided with a laterally extending boss 39 having a cylindrical port therethrough in which is seated a tubular valve 40 having a stem 41 slidably mounted in a suitable way in a screw threaded plug 42 which is seated in an aperture in a boss 43 in the casing. The aperture through the casing is in axial alinement with the port of the boss 39 and is larger in diameter than said port so that a drill can be readily introduced through the aperture in the boss in the casing for the purpose of boring the port. The tubular valve 40 is provided with a flange 44 which preferably engages a counter-sunk wall of the boss 39, and is normally held in engagement therewith by a helical spring 45 surrounding the stem 41 and abutting against said flange 44 and the plug 42.

Figure 3:
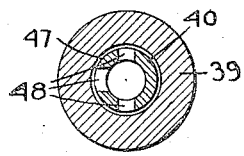
Fig. 3 is a sectional view on lines 3—3 Fig. 1 through the unbalanced valve and its seat.

The tubular portion of the valve is provided with a narrow cylindrical section 46 which fits within the port in the boss 39 and a reduced section 47 intermediate of said cylindrical section and the flange 44. Apertures 48, preferably three in number and unsymmetrically arranged relatively to each other, are provided in the wall of the reduced portion 47 and communicate with the interior of said tubular valve. As illustrated in Fig. 3, three of such ports are provided, two of which are diametrically opposite and the other at right angles thereto. By reason of this unsymmetrical arrangement, the fluid flowing through the tubular valve exerts a lateral pressure against the side which contains no port which will hold the valve firmly against vibration and will prevent chattering. In the operation of the device any heavy shock which forces the piston downwardly will serve to unseat the valve thereby permitting the fluid to flow through the apertures 48 into the channel formed by the reduced portion 47 of the valve and thence into the fluid chamber. As soon as the force of the shock is dissipated the spring 45 will re-seat the flange 44 of the valve thereby retaining the remaining fluid within the cylinder.

The present invention contemplates the use of a further means for restricting the flow of fluid from the cylinder or piston containing compartment into the fluid chamber which will produce such resistance to the movement of the piston as effectively to absorb shocks which are too light to operate the tubular valve 40. This is accomplished by providing a conduit leading from the piston containing compartment or cylinder through which the fluid in the cylinder may be forced in currents so disposed as to impinge upon each other, or to impinge upon a reflecting surface, or both, as to impede the flow of the fluid and cause the same to offer a substantial resistance to the flow of the current through said conduit. By reason of this interference and the eddying of the fluid occasioned thereby within the conduit an increased resistance is produced to the flow of the fluid through the conduit which is in correlation with the force applied to the piston; that is to say, when an increased force is applied to the piston the interference of the currents flowing through the conduit and the reflection of the fluid of such currents against the direction of the current causes a greater resistance to the flow of the fluid through the conduit in proportion to the increase in the power applied to the piston so that the shock absorber becomes equally effective upon light and heavy shocks.

In the preferred embodiment of the invention disclosed herein the piston head is provided with a conduit 50 which is formed by boring a hole vertically downwardly through the boss 15 and piston head 14. The upper portion of the walls of the conduit 50 are provided with screw threads 51, while the lower portion of said conduit is counter-bored to provide an enlarged portion 52. Lateral apertures or ducts 53 lead from the conduit or hole 50 through the wall of the boss 15 and serve to discharge the fluid passing through the conduit from the cylinder into the fluid chamber. In order to restrict the flow of fluid through the conduit a plug 54 is provided which has screw threaded upper and lower portions 55 and 56 and an intermediate reduced portion 57 which, when the plug is seated within the hole 50 provides an annular recess 58 which communicates with the ports 53. The plug 54 is centrally bored from its lower end to provide a chamber 59 and the walls of said chamber are provided with ports 60 through said reduced portions 57 so that fluid which enters the chamber 59 may flow through said ports and the recesses 58 to the ports 53 and thence to the fluid chamber. A nozzle extending into the chamber 59 is seated in the lower portion of the plug and preferably provides a lower cylindrical portion 61 of smaller diameter than that of the conduit 50, having a solid end provided with lateral ports 62 leading to a central duct 63 extending to the end of the nozzle. The nozzle is provided with a screw threaded portion 64 which engages complementary screw threads in the lower portion of the plug and a reduced upper portion 65 which is of smaller diameter than the bore of the chamber 59. When the piston is depressed the fluid flows upwardly through the cylindrical recess surrounding the lower end 61 of the nozzle member, thence through the ports 62 which are disposed diametrically opposite to each other. The currents which flow through these ports impinge upon each other and consequently create a resistance to the free flow of the fluid from either port through the duct 63 of the nozzle. The resistance to the flow of fluid through the conduit is further impeded by reason of the fact that the jet issuing from the duct 63 of the nozzle impinges against the solid wall of the upper portion of the plug and is reflected against itself.

The end of the nozzle 65 desirably is above the ports 60 so that the fluid is required to flow in a still more irregular course from the chamber 59 through the ports 60 and the passage or recess 51 to the discharge ports 53. The construction is such that no matter how vigorous the action of the piston, or how great a force is applied to it, the flow of fluid will be properly retarded in correlation to the force acting upon the piston, so that the shock absorber may be adapted to any kind of use and with vehicles of varying sizes.

When the force exerted upon the piston is too great to be dissipated by the action of the restricting mechanism in the piston head, the unbalanced valve will properly yield to produce the correct cushioning effect.

It will be understood that the embodiment of the invention disclosed herein is merely of an illustrative character and is not restrictive and that various modifications of the present invention may be made within the spirit and scope of the following claims.

Having thus described my invention, what I claim as new and desire to secure by Letters Patent, is:

1. A shock absorber comprising a casing having a plurality of fluid containing compartments, a piston in one of said compartments, a valve operating to permit the fluid to flow freely into said piston containing compartment upon movement of the piston in one direction and to prevent the flow of fluid therethrough upon movement of the piston in the opposite direction, and an irregular impeded delivery conduit leading from said fluid containing compartment operating upon movement of the piston in said opposite direction to cause a reflection of the current of fluid passing therethrough upon itself whereby resistance to the flow of the fluid is increased in correlation to the increase in force applied to the piston.

2. A shock absorber comprising a casing presenting a plurality of fluid containing compartments, a piston in one of said compartments, a valve operable to permit fluid to flow freely into said piston containing compartment upon movement of the piston in one direction and to prevent the flow of the fluid therethrough upon movement of the piston in the opposite direction, a restricted conduit having irregular passages operating to cause a plurality of currents passing through said conduit to impinge against each other whereby restriction to the flow of the fluid is increased in correlation to the increase in force applied to the piston.

3. A shock absorber comprising a casing presenting a plurality of fluid containing compartments, a piston in one of said compartments, a valve operable to pemit fluid to flow freely into said piston containing compartment upon movement of the piston in one direction and to prevent the flow of the fluid therethrough upon movement of the piston in the opposite direction, and means for delivering fluid from said piston containing compartment operable upon the movement of the piston in said opposite direction, including a nozzle, and means for obstructing the jet of fluid delivered from said nozzle whereby resistance to the flow of fluid through said conduit is increased in correlation to the increase in force applied to the piston.

4. A shock absorber comprising a casing presenting a plurality of fluid containing compartments, a piston in one of said compartments, a valve operable to permit fluid to flow freely into said piston containing compartment upon movement of the piston in one direction and to prevent the flow of the fluid therethrough upon movement of the piston in the opposite direction, and means for delivering fluid from said piston containing compartment upon movement of the piston in said opposite direction including a nozzle having a plurality of oppositely disposed admission ports operating to cause impingement against each other of jets of fluid entering the nozzle and means for obstructing the jet of fluid delivered from the nozzle whereby resistance to the flow of the fluid is increased in correlation to the increase in force applied to the piston.

5. A shock absorber comprising a casing presenting a plurality of fluid containing compartments, a piston in one of said compartments, a valve operable to permit fluid to flow freely into said piston containing compartment upon movement of the piston in one direction and to prevent the flow of the fluid therethrough upon movement of the piston in the opposite direction, a conduit for delivering the fluid from said fluid chamber including an annular passage, a central duct within the same, and ports leading from said annular passage to said central duct adapted to cause the currents of fluid flowing therethrough to impinge against each other.

6. A shock absorber comprising a casing presenting a plurality of fluid containing compartments, a piston in one of said compartments, a valve operable to permit fluid to flow freely into said piston containing compartment upon movement of the piston in one direction and to prevent the flow of the fluid therethrough upon movement of the piston in the opposite direction, a conduit for delivering the fluid from said piston containing compartment including a plurality of annular passages, a duct concentric in respect to said annular passages, and a plurality of ports leading from said duct to each of said annular passages.

7. A shock absorber for cushioning the movement of two relatively movable members, comprising a casing adapted to be secured to one of said members presenting a fluid chamber and a cylinder, a piston reciprocable in said cylinder, means for securing said piston to the other relatively movable member, a valve operating to permit fluid to flow freely from said fluid chamber to said cylinder upon movement of the piston in one direction and to prevent the flow of fluid therethrough upon movement of the piston in the other direction, a conduit in said piston, and a chambered plug in said conduit having communicating external and internal passages operating to cause the fluid to follow a plurality of irregular and interfering courses through said conduit.

8. A shock absorber for cushioning the movement of two relatively movable members comprising a casing adapted to be secured to one of said members presenting a fluid chamber and a cylinder, a piston reciprocable in said cylinder, means for securing said piston to the other relatively movable member, a valve operating to permit fluid to flow freely from said fluid chamber to said cylinder upon movement of the piston in one direction and to prevent the flow of fluid therethrough upon movement of the piston in the other direction, a conduit in said piston, a centrally chambered plug in said conduit having screw threaded end portions engaging the walls of said conduit and an intermediate passage-way, a nozzle extending into the chamber in said plug having a base portion of smaller diameter than said conduit, a lateral port in the base portion of said nozzle and ports leading from the chamber of said plug to said passage-way, and means for delivering the fluid from said passage-way to said fluid chamber.

9. A shock absorber for cushioning the movement of two relatively movable members, comprising a casing adapted to be secured to one of said members, presenting a fluid chamber and a cylinder, a piston reciprocable in said cylinder, means for securing said piston to the other relatively movable member, a valve operable to permit fluid to flow freely from said fluid chamber to said piston upon movement of the piston in one direction and a conduit in said piston presenting a plurality of irregular passage-ways operating to cause the currents of fluid passing therethrough to impinge against each other whereby resistance to the flow of said fluid is increased in correlation to the increase in force applied to the piston.

10. A shock absorber for cushioning the movement of two relatively movable members, comprising a casing adapted to be secured to one of said members and presenting a fluid chamber and a cylinder, a piston reciprocable in said cylinder, means for establishing a free flow of fluid from the fluid chamber to the cylinder upon movement of the piston in one direction and for preventing the flow of fluid from said cylinder to said fluid chamber upon movement of the piston in the opposite direction, the wall of said cylinder having a delivery port leading from the cylinder, a tubular chambered valve seated in said port having a plurality of unsymmetrically disposed apertures, and yieldable means for normally maintaining the valve closed.

11. A shock absorber comprising a casing having an open top and presenting an enclosed fluid chamber, a cylinder, the lower end of said casing having an aperture therethrough to permit access to the interior of said casing and cylinder, a countersink in the wall of said aperture, an expansible disk closing said aperture and detachable means for covering the top of said casing.

12. A shock absorber comprising a casing presenting a fluid chamber and a cylinder, having a head spaced apart from the bottom of said fluid chamber and provided with a port, a valve cage having a flange seated upon said cylinder head enclosing said port, and a transverse web, a valve for said valve cage having a central stem extending downwardly through said web, a spring normally holding said valve seated upon said cage, a helical spring seated upon the flange of said valve cage and engaging at its upper end the under face of said piston and acting to retain said valve cage upon its seat and to raise said piston.

13. A shock absorber for cushioning the movement of two relatively movable members, comprising a casing adapted to be secured to one of said members and presenting a fluid chamber and a cylinder, a piston reciprocable in said cylinder, means for establishing a free flow of fluid from the fluid chamber to the cylinder upon movement of the piston in one direction and for preventing the flow of fluid from said cylinder to said fluid chamber upon movement of the piston in the opposite direction, the wall of said cylinder having a delivery port leading from said cylinder, a tublar chambered valve seated in said port having an external annular recess, a plurality of unsymmetrically disposed apertures leading from said chamber to said recess and yieldable means for normally maintaining the valve closed.

14. A shock absorber comprising a casing presenting a fluid chamber and an enclosed cylinder, a piston reciprocable in said cylinder, a valve operable to permit fluid to flow freely from said fluid chamber into said cylinder and to prevent fluid from flowing from said cylinder into said fluid chamber, a port in the walls of said cylinder communicating with said fluid chamber, a relief valve comprising a tublar chambered portion adapted to enter said port and having an external reduced portion intermediate of its ends, a plurality of unsymmetrically disposed apertures leading from said chamber to said reduced portion and yieldable means for normally maintaining the valve closed.

15. A shock absorber comprising a casing presenting a fluid chamber and an enclosed cylinder, a piston reciprocable in said cylinder, a valve operable to permit fluid to flow freely from said fluid chamber into said cylinder and to prevent fluid from flowing from said cylinder into said fluid chamber, a port in the walls of said cylinder communicating with said fluid chamber, a relief valve comprising a tubular chambered portion adapted to enter and fit said port and having an external annular channel intermediate of its ends and a plurality of unsymmetrically disposed apertures leading from said chamber to said annular channel and yieldable means for normally maintaining the valve closed.

16. A shock absorber comprising a plurality of fluid-containing compartments, a piston reciprocable in one of said compartments, means operable to permit the fluid to flow freely into the piston-containing compartment upon movement of the piston in one direction and means for restricting the flow of fluid from the piston containing compartment upon movement of the piston in the other direction including a conduit in the head of said piston and means in said conduit for resisting the flow of liquid therethrough in correlation to the increase of force applied to the piston.

17. A shock absorber comprising a casing adapted to be secured to one of two relatively movable members and presenting a plurality of liquid-containing compartments, a piston reciprocable in one of said compartments, a rock shaft mounted in said piston adapted to be connected to the other relatively movable member, an arm connected to said piston having an aperture to receive said rock shaft and a plug having screw threaded connection with said arm and provided with an end portion having a smooth periphery fitting in a socket in said rock shaft.

18. A shock absorber comprising a casing adapted to be secured to one of two relatively movable members presenting a plurality of liquid-containing compartments, a piston reciprocable in one of said compartments, a rock shaft mounted in said casing having an arm connected to said piston and an external reversible arm adapted to be connected to the other relatively movable member.

In testimony whereof, I have signed my name to this specification.

RALPH M. LOVEJOY.